Figure 1:
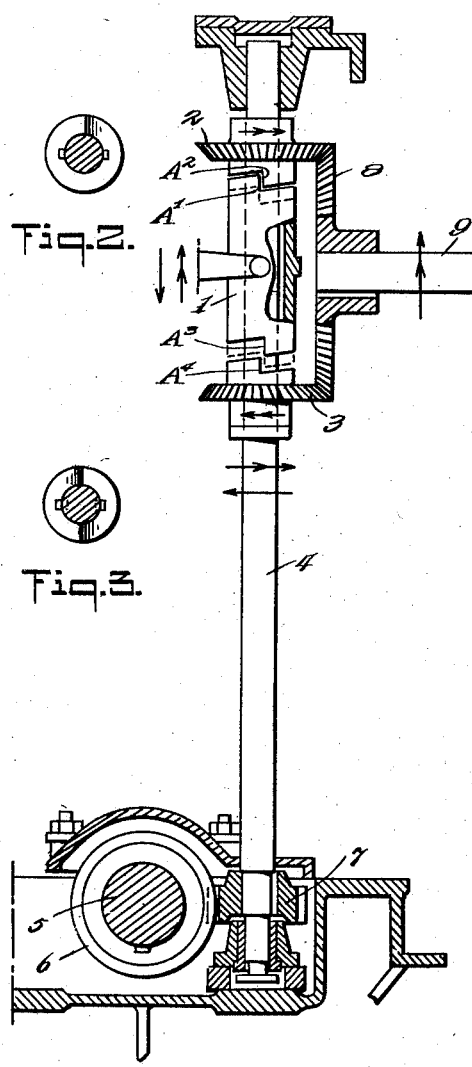
Figure 57:
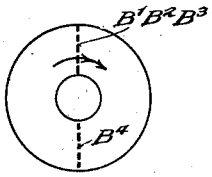
Figure 58:
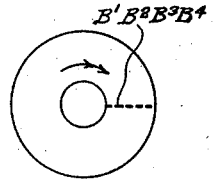
Figure 59:
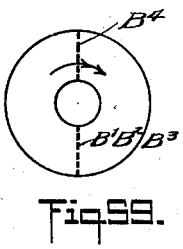
Figure 60:
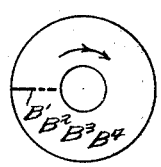
Figure 61:
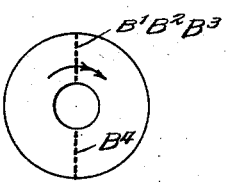
Figure 62:
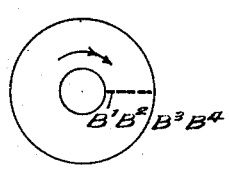
Figure 63:
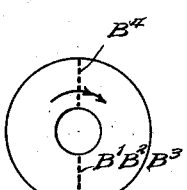
Figure 64:
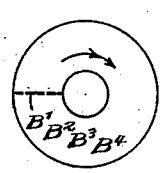

Jan. 7, 1930. P. PRAETORIUS 1,742,276
STARTING AND REVERSING DEVICE FOR INTERNAL COMBUSTION ENGINES
Filed June 29, 1923 7 Sheets-Sheet 1

INVENTOR
Paul Praetorius
BY Francis Marburg
ATTORNEY

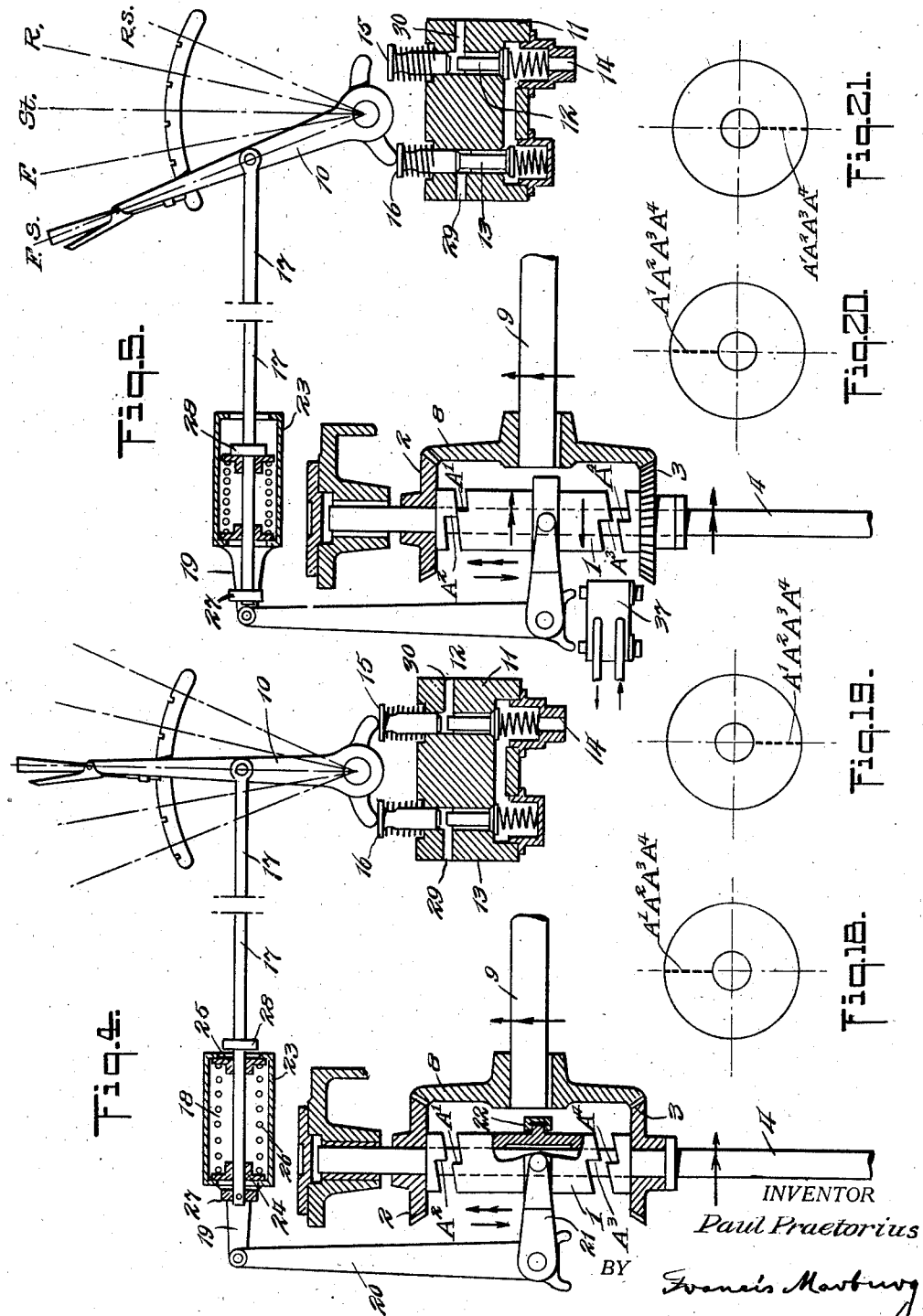

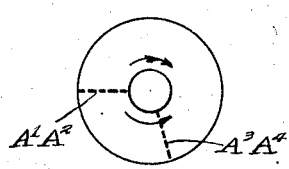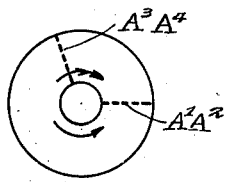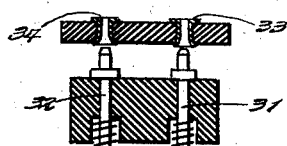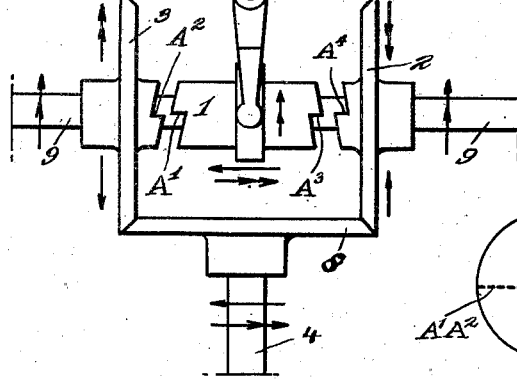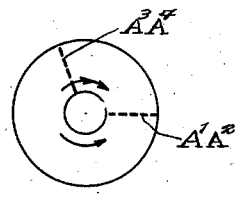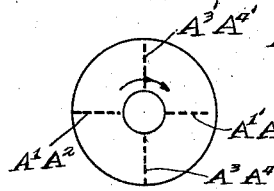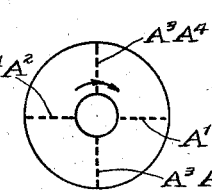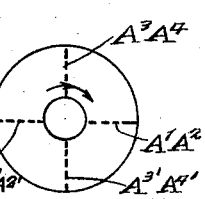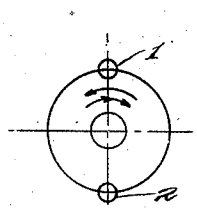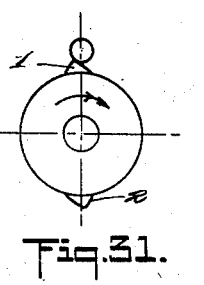

Jan. 7, 1930.　　　　P. PRAETORIUS　　　　1,742,276
STARTING AND REVERSING DEVICE FOR INTERNAL COMBUSTION ENGINES
Filed June 29, 1923　　　7 Sheets-Sheet 4
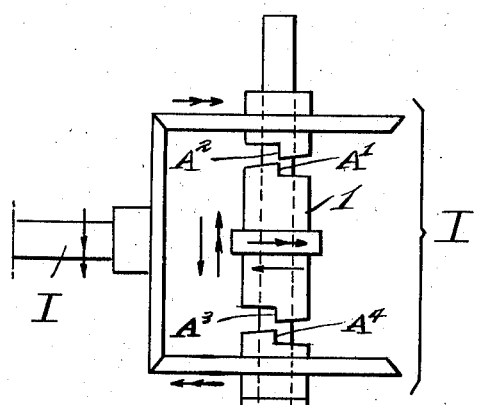
Fig.7.
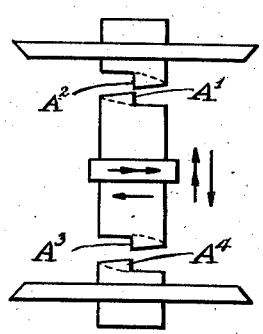
Fig.8.
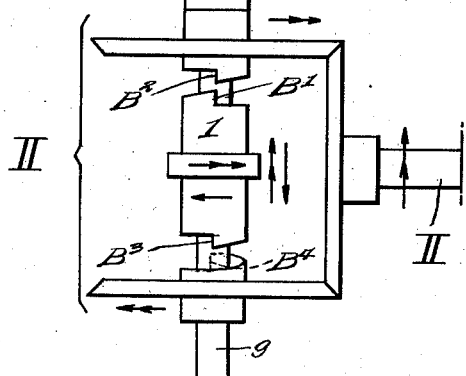
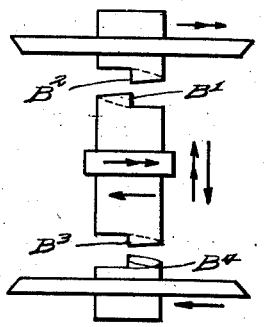
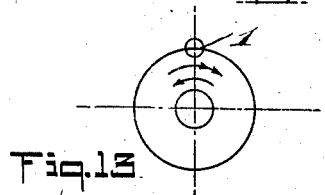
Fig.13.
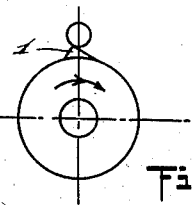
Fig.14.
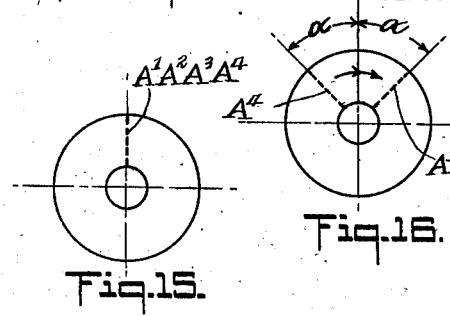
Fig.16.　Fig.17.
Fig.15.
INVENTOR
Paul Praetorius
BY
ATTORNEY

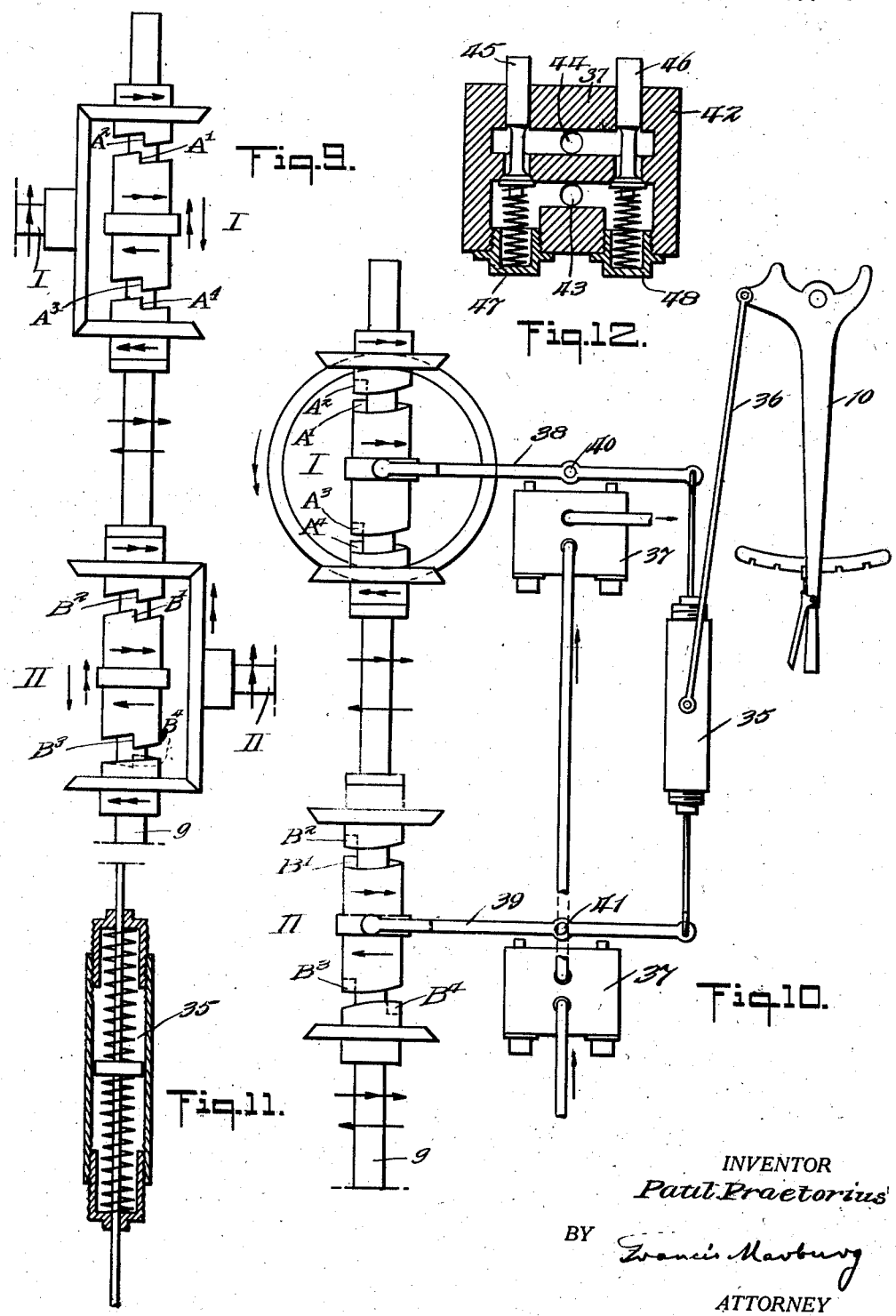

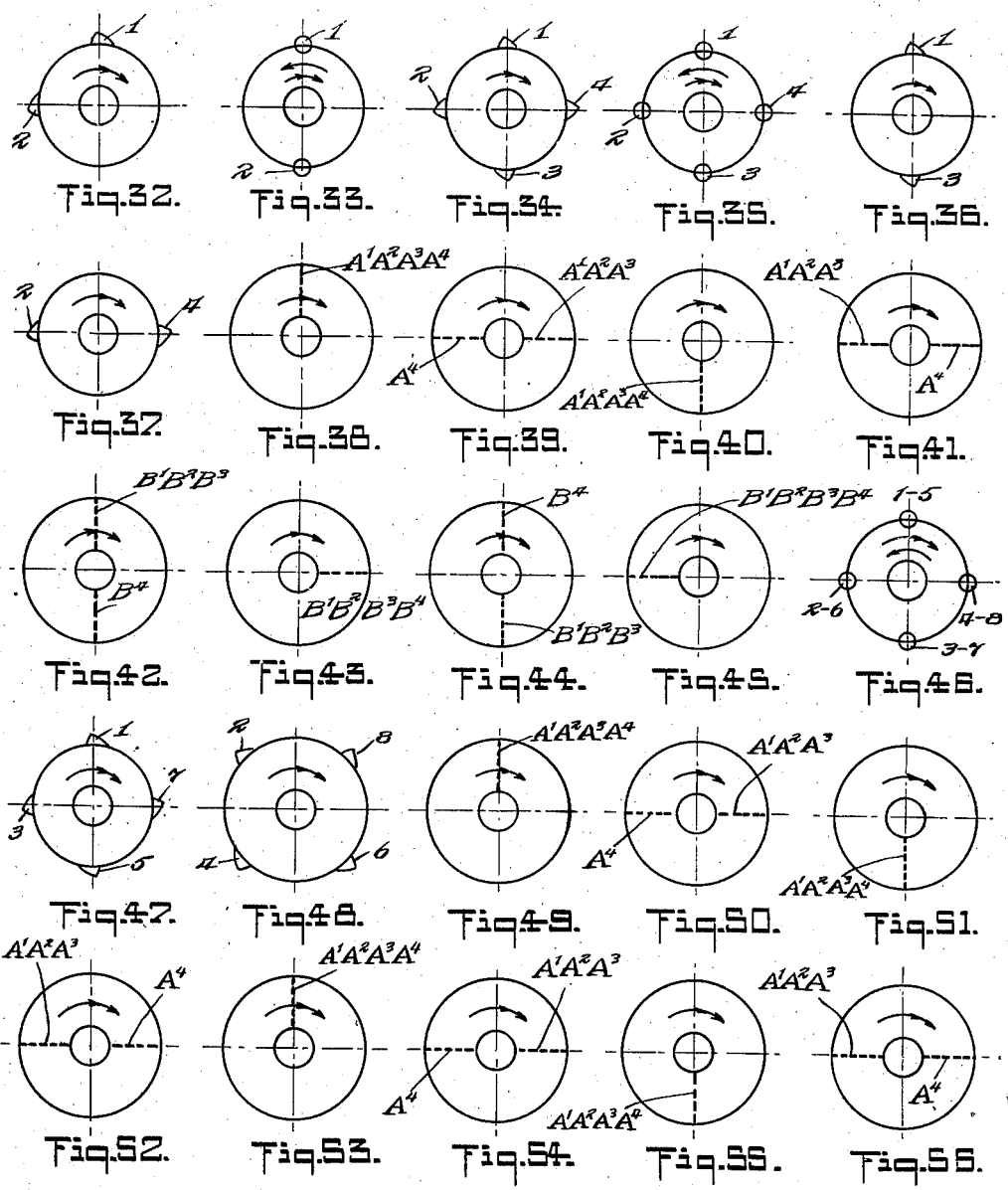

Jan. 7, 1930.   P. PRAETORIUS   1,742,276
STARTING AND REVERSING DEVICE FOR INTERNAL COMBUSTION ENGINES
Filed June 29, 1923   7 Sheets-Sheet 7

INVENTOR
Paul Praetorius.
BY
his ATTORNEY

Patented Jan. 7, 1930

1,742,276

UNITED STATES PATENT OFFICE

PAUL PRAETORIUS, OF DARMSTADT, GERMANY

STARTING AND REVERSING DEVICE FOR INTERNAL-COMBUSTION ENGINES

Application filed June 29, 1923. Serial No. 648,497, and in Germany October 18, 1922.

My invention relates to improvements in starting and reversing devices for single cylinder, and for multi-cylinder internal combustion engines, being started and reversed by means of a starting and reversing motor, such as for instance an airturbine, as shown in applicant's United States Patent #1,165,539 of Dec. 28th, 1915, or by means of electric or other power, and its main object is, to provide simple and reliable means, whereby the camshaft of the engine may be always driven in one and the same direction of rotation, being always correctly timed, while the crankshaft may be reversed at will. Some features of my invention relate to engines, wherein the cranks are opposed, other features relate to engines wherein cranks are offset 90 degrees and wherein several camshafts may be used, the latter being arranged to be driven in a novel manner, whereby the angular relations between the several camshafts at each successive reverse of the crankshaft will be changed. In my present improved device, a movable coupling member may be controlled by the main starting and reverse lever of the engine, whereby its operation becomes more positive than in previously known similar devices. In order to make it possible under all circumstances, to operate the reversing device from the engine starting lever, I provide elastic controlling means, or flexible connecting means, such as will be shown and explained hereinafter, which may be inserted between the main engine starting lever and said movable coupling member, whereby said member may be coupled or uncoupled for forward or reverse motion of the crankshaft, in such manner, that the device becomes fool-proof, thus adding to the safety and reliability of my device. Another improvement which may be used in connection with my device and which will be shown and explained hereinafter, is a fuel supply control device, which cooperates with my starting and reversing device, making it only possible to run the engine on fuel oil if said movable coupling member is engaged substantially at full or normal depth. Previous reversing devices depended far more on the care and attention of skilled operators. Previous socalled automatic devices, were unreliable. With applicant's device it becomes possible, to use a single lever for starting, stopping and reversing an engine. His device is remarkably simple, easy and quick to handle, mistakes being practicably impossible. My present device is particularly of great value in connection with large internal combustion engines, which must be absolutely reliable and foolproof.

My invention is of most value if used with multi-cylinder four cycle engines wherein heretofore duplicate sets of cams were used for forward and reverse rotation of the crankshaft and wherein it has heretofore been common practice to shift the camshaft. It has been found, at reverse, that on account of pressure, resting on one or more cams, it may at times become difficult to shift the camshaft quickly. With applicant's device, a single set of cams is used, the cams revolving always in one and the same constant direction, all cams remaining correctly timed if the crankshaft is reversed—the camshaft requiring no shifting while reversing the engine.

In comparison with such previous devices, my mechanisms are very simple, easily handled, and reliable, as will be shown in connection with the drawings attached hereto, which illustrate my invention.

Referring now to the drawings, Fig. 1 is a vertical view, partly in section, of a set of reverse coupling members, the latter being adapted to be used in connection with a 1, 2 or 4 cylinder engine of 4 cycle type being mounted on a vertical transmission shaft, driven from the main crankshaft at crankshaft speed, and in turn driving a camshaft of a 4 cycle engine. Figs. 2 and 3 show a face of a sleeve or coupling member, the latter having either one or two claws and being driven from a shaft, by means of keys, axially slidable thereon. Figs. 4 and 5 represent a vertical section through a similar set of reverse coupling members, the latter being mounted on a transmission shaft and reversed through the motion of a lever, the latter simultaneously operating air valves for starting and reversing the main engine by means of an auxiliary starting motor or air turbine. Fig. 6 shows a somewhat different set of reverse coupling members, three of these members being mounted directly on a camshaft. Fig. 7 shows an arrangement of two complete sets of reverse coupling members, being especially adapted for a 4 cylinder 2 cycle engine, being mounted on a vertical transmission shaft, revolving at crankshaft speed and operating respectively two separate camshafts. Fig. 8 represents angular positions of reverse coupling members, similarly as shown in combination with a transmission shaft and two camshafts in Fig. 7. Figs. 9 and 10 show a similar arrangement as shown in Fig. 7 of 2 complete sets of reverse coupling members, the transmission shaft 9 being driven at one half camshaft speed, operating respectively 2 separate camshafts, being especially adapted for an 8 cylinder 4 cycle engine.

Figure 65:
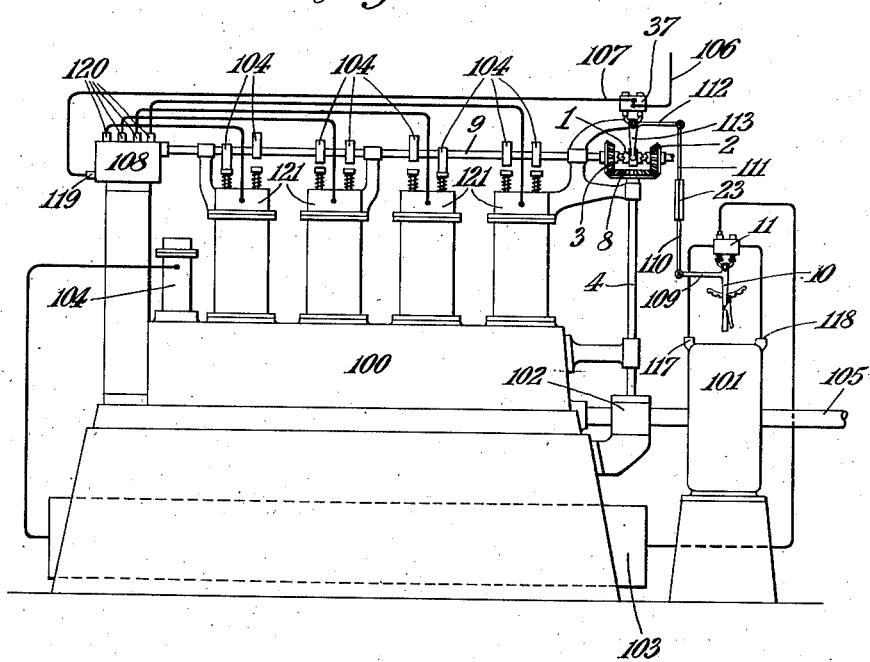

As shown herein, the sleeves or the male coupling members, are simultaneously being shifted for the purpose of reversing the gears through means being connected with the engine starting and reversing lever, the latter controlling an electric starting device for a separate starting motor not shown herein. Fig. 11 is a section through an elastic member, the latter having been shown in connection with Fig. 10. Fig. 12 is a vertical section through a fuel control valve, the latter having been shown in Figs. 5, and 10. Figs. 13 and 14 show diagrammatically respectively simultaneous relative angular positions of a crank, being in top dead center position, and of a fuel cam of a one cylinder engine. Figs. 15 to 17 inclusive show in a schematic way relative angular positions of driving and driven surfaces of members of a reverse coupling, while the said crank is in various angular positions. Figs. 18 to 29 inclusive, show angular positions of coupling surfaces of differently arranged couplings. Figs. 30 to 32 inclusive, show diagrams of cranks and cams for 2 cylinder 2 cycle and 2 cylinder 4 cycle engines, while Figs. 33 and 34 show similar diagrams of a 4 cylinder 4 cycle engine. Figs. 35 to 37 inclusive, show diagrams of crank and cam positions, relating to a 4 cylinder 2 cycle engine, and Figs. 38 to 45 inclusive, represent respectively successive simultaneous angular positions of the driving and driven surfaces of two separate complete sets of reverse couplings, the latter being used for the purpose of operating two separate camshafts, as shown in Figs. 7 and 8. Figs. 46 to 48 inclusive, show respectively, corresponding angular positions of eight cranks and eight cams of an eight cylinder 4 cycle engine, while Figs. 49 to 64 inclusive, represent eight successive angular positions of the driving and driven surfaces of each of two separate sets of reverse couplings, being used for driving respectively two separate camshafts, eight successive simultaneous angular positions of the coupling surfaces of each of the sets of reverse couplings being shown herein. Fig. 65 shows diagrammatically a general arrangement of my patented device in combination with a 4 cylinder 4 cycle engine.

Referring now specifically to Fig. 1, 1 represents a coupling sleeve, being the driving or male coupling member, having a claw at each end, the respective driving claw surfaces, being marked $A^1$ and $A^3$. 2 and 3 are reverse gears, containing the driven coupling members or claws, the respective driven claw surfaces being marked $A^2$ and $A^4$ and claw surfaces being marked $A^2$ and $A^4$ and being adapted to be respectively and successively engaged by the claws of the coupling sleeve. 4 is a vertical transmission shaft, on which the coupling and reverse gears are being mounted, the sleeve being revolved by the shaft by means of keys or otherwise, being free to be shifted axially thereon, while the gears may revolve loosely thereon and in opposite directions of rotation, if the shaft revolves and if either one of the driven coupling members is being engaged by the respective claw of the sleeve. 5 represents the crankshaft of an engine, 6 is a screw, being mounted firmly on the crankshaft. 7 represents a spiral gear being mounted firmly on the transmission shaft and as illustrated, being driven by said screw at crankshaft speed, driving in turn the transmission shaft, the latter revolving the sleeve. 8 represents a gear, and 9 is a camshaft, being driven by gear 8, the latter being mounted firmly thereon. It will be seen, that if the sleeve is shifted in the direction of the double arrow, that is in its upper position shown in full lines, gear 8 and camshaft 9 revolve in the direction of the double arrow, provided, that the transmission shaft revolves in direction of the double arrow. If on the other hand, the sleeve is shifted in reverse position, that is in the direction of the single arrow, the camshaft is reversed. It however will be seen, that if the crankshaft is reversed, simultaneously while the sleeve is shifted in the reverse position, the camshaft revolves again in the direction of the double arrow, that is in its original direction. The crankshaft may therefore if the sleeve is simultaneously reversed, be shifted at will, while the camshaft may revolve only in one and the same direction.

Fig. 2 shows an end view of a coupling face, or claw, the latter consisting of a single tooth, the back of which may gradually rise from its lowest to its highest point in a substantially spiral line or curve. Fig. 3 shows a coupling face, wherein two claws are shown, the back of each of said claws gradually rising to its highest point, similarly as the claw shown in Fig. 2. The claws shown in Figs. 2 and 3, may be used, in connection with my reverse coupling members, depending on whether the coupling sleeve revolves at crankshaft or camshaft speed, as will later on be explained.

Referring to Figs. 4 and 5, the design of the coupling members shown therein may be identically the same as the one shown in Fig. 1. The driving surfaces of the sleeve 1 and the driven surfaces of the reverse gears 2 and 3, being again respectively marked $A^1$, $A^3$ and $A^2$, $A^4$. The new features, shown in Figs. 4 and 5 will now be explained. 10 shows a starting and reversing lever of an engine, 11 is a valve casing, 12 and 13 may be respectively air valves, which may normally be kept closed, by means of springs or otherwise, if the engine stops or runs on fuel. 14 is an aperture, which may be connected to some pressure air tank as shown and explained later on, the tank containing compressed air for starting the engine. An air turbine, above referred to, may be used, being preferably mounted directly on the fly-wheel of the engine. 15 and 16 may represent slides, normally being kept in the positions shown, by springs. 17 shows a rod and 18 represents an elastic member, which will be explained later on. 19 is a fork, being attached to the member 18. 20 and 21 are levers, being operated by the fork 19. 22 is a slip ring, by means of which, lever 21 may shift the sleeve 1 axially, thus causing either the coupling surfaces $A^1$ and $A^2$ or $A^3$ and $A^4$ to become successively engaged, depending on the direction in which the crankshaft revolves.

Referring again to the member 18, the latter may consist of a cylindrical part 23, disk-shaped plates 24 and 25, and a spring 26. 27 and 28 may be collars, which may be tight on the rod 17, while plates 24 and 25 may be loose on said rod. The spring 26 may be pressing said plates 24 and 25 slightly against both ends of part 23. The manner in which said elastic member operates, may be as follows: If the lever 10 is shifted towards the left side into position marked F. S., (forward starting) the spring is strongly compressed (Fig. 5) thus pressing the sleeve 1 strongly upwards. At the same time, the lever 10 may press on the slide 16, the latter pressing against valve 13, opening the latter, permitting air to pass by the valve, through port 29, the air being conducted to the nozzles of an airturbine, the latter driving the crankshaft in forward direction of rotation. As soon as the crankshaft revolves, sleeve 1 turns in the direction indicated by the double arrow, the sleeve gradually sliding upwards, as fast as the spiral shaped back of the claw permits, releasing the spring tension somewhat, until its driving surface $A^1$ is fully in contact with the driven surface $A^2$ of gear 2, whereupon the camshaft will be picked up and driven by the sleeve. After the engine runs on fuel, the starting lever may be retarded into position marked F, (forward running), in which position the compressed air is cut off, the spring tension being now less, but being sufficient to hold the coupling-sleeve in running position. If the lever is now pushed backwards into position S. T. (stop position) wherein all coupling members are disengaged from each other, and from there further into position R. S. (reverse starting) the same series of actions take place, except that the reverse is taking place as before, the crankshaft starting in reverse direction of rotation, through compressed air being permitted to enter through valve 12, passing through aperture 30 and from there to a reversible air turbine or the like, of known design, starting the crank in reverse direction of rotation, until the engine runs on fuel, whereupon the lever 10 may be moved back into position R. (reverse running), wherein compressed air is again cut off and wherein the tension of the spring is still sufficient to hold the sleeve in reverse running position. What is particularly new herein, is the fact, that the spring, in the elastic member 18, is first compressed through the action of the reverse lever, in the one or in the other direction, whereby the elastic member and levers, etc., may fully shift the sleeve into either forward or reverse starting position.

It will be seen, that the use of the elastic member is essential, inasmuch as it would be impossible in some positions to move the lever in either forward or reverse starting position, unless an elastic or flexible member was inserted between the starting lever and the coupling sleeve, thus permitting the starting air valve to be opened. To explain the action still more, the sleeve 1 preferably is arranged to slide easily on shaft 4, in such manner, that as soon as the lever 10 is pushed into position marked F, (Fig. 5) the sleeve may be pushed against the spiral back of the claw, shown in connection with gear 2, before lever 10 forces the air valve 13 to open and before the crankshaft and sleeve 1 are revolved by air turbine or by any known type of auxiliary motor. After the sleeve has thus been shifted more or less endwise, the lever 10 may be shifted into position F. S. causing the crankshaft and sleeve to revolve, until the camshaft is driven and the engine may run on fuel. The compressed air may be cut off by slightly retarding the lever 10, after starting the engine on fuel, while the coupling sleeve will still be held in running position by the pressure of the elastic member. In connection with the elastic member just explained, it is seen, that the shape of the back of each claw, has a tendency to throw out the coupling, the instant the crankshaft is being reversed, thus assisting in shifting the sleeve in the direction towards its reverse position, each time the engine is reversed, which is very important, because otherwise, the cams might for a revolution, or so, operate in wrong direction, being wrongly timed. For this reason, the back of the coupling tooth or claw is made so, that it can not drive backwards the same gear which it drove in forward direction of rotation.

Fig. 6 shows somewhat different reverse coupling members a coupling sleeve being arranged in a horizontal position, mounted directly on the camshaft of an engine. 4 represents herein a vertical transmission shaft, 1 being a sleeve, having now driven surfaces $A^1$ and $A^3$, 2 and 3 representing loose transmission gears having now respectively driving surfaces $A^2$ and $A^4$. 8 is a gear, being now mounted firmly on the transmission shaft, and driving successively the gears 2 and 3, while the claws of the latter may successively engage the respective claws of said sleeve, which latter may drive the camshaft by means of keys or otherwise. It will be seen, that if the transmission shaft revolves in the direction of the double arrow, the camshaft must also revolve in the direction of the double arrow, provided the sleeve has been shifted towards left, in the direction of the single arrow. If the crankshaft and the transmission shaft are reversed, while the sleeve is simultaneously being shifted towards right, in direction of the double arrow, the camshaft will continue to revolve in the same direction of rotation as before, that is in direction of the double arrow. The transmission shaft is herein shown to run at camshaft speed. This arrangement may be used in connection with one, two, and four cylinder 4 cycle engines and with one and two cylinder 2 cycle engines, except that in 2 cycle engines the camshaft is driven at crankshaft speed and in 4 cycle engines the camshaft is driven at one-half crankshaft speed.

Fig. 7 shows an arrangement comprising two complete sets of reverse coupling members marked I and II, being adapted for reversing a 4 cylinder 2 cycle engine, said reverse coupling members or reverse gears driving respectively two separate camshafts (marked I and II) of the engine, each camshaft operating the cams, etc., for certain of the cylinders. The two sets of reverse coupling members I and II which may revolve at camshaft speed, may be mounted on a single transmission shaft, as shown herein. In the upper reverse gear set I all driving and driven coupling surfaces, are marked identically as in all previous drawings, namely $A^1$, $A^2$, $A^3$, $A^4$, while in the lower reverse gear set II the driving and driven surfaces are marked $B^1$, $B^2$, $B^3$, $B^4$, in order to be able, later on, to differentiate clearly between the coupling surfaces of the two coupling sets.

Fig. 8 represents a clearer view of the two sets of reverse couplings, which may be used with the design shown in Fig. 7, showing clearly relative angular positions of the two sets of reverse couplings, during forward direction of rotation of the crankshaft, while the coupling sleeves revolve in the direction of the double arrow. In order to show the positions of the coupling driving surfaces more clearly, the coupling sleeves are shown disengaged. It will be seen, that the members of the upper set of reverse couplings, driving camshaft I, are in such angular positions, that the sleeve may be shifted directly into actual driving positions, either forward or reverse, substantially without changing the angular positions of either one of the reverse gears. It will also be seen, that the members of the lower set of reverse couplings, are in such angular positions, that the sleeve may be shifted upwards, in direction of the double arrow, into forward driving position, substantially without changing the relative angular positions of any of the reverse gears, but it will be seen, that if the latter sleeve is shifted downwards, in direction of the single arrow, the sleeve, having the driving surface $B^3$ can not engage the gear, having the driving surface $B^4$, unless and until the transmission shaft (Fig. 7) has revolved in reverse direction, 180 degrees, after which the sleeve may pick up and drive the lower reverse gear, driving the latter in reverse direction of rotation, revolving the camshaft II in the same direction as before reversing. The relative positions of the members of the two sets of reverse couplings, as shown herein, may occur, each time one or more of the cranks are in dead center positions, while the crankshaft revolves in forward direction. The object of this will be fully explained later on.

Figs. 9 and 10 show an arrangement, wherein an 8 cylinder 4 cycle engine with the usual arrangement of cranks, may be reversed, two complete sets of reverse gears and couplings being again mounted on a single transmission shaft. The shape of the claws, in this as in all previous designs, may be as shown in Fig. 2. In the upper set of reverse couplings driving and driven coupling surfaces are again marked identically as in Figs. 7 and 8, namely $A^1$, $A^2$, $A^3$, $A^4$, while in the lower set of reverse couplings, the driving and driven surfaces are respectively marked $B^1$, $B^2$, $B^3$, $B^4$. By looking at Figures 9 and 10, it will be seen, that each of the camshafts will be driven in the direction of the double arrow, if the couplings are simultaneously being shifted in advance and retard, while the crankshaft is being reversed. The driving and driven claw surfaces, of coupling sets I and II, may in the design shown in Figs. 9 and 10 be in the same relative angular positions as shown in Fig. 8, provided a crank is in dead center position during forward direction of rotation of the crankshaft. In each case, the crankshaft, must, at reverse, revolve 180 degrees, before the one of the two camshafts may again be driven, while the other one of the camshafts may be instantly driven, as soon as the crankshaft starts to revolve in reverse direction. Referring to other details of the reverse mechanism shown in Figs. 9 and 10, 36 is a rod, which may be operated by an engine starting lever 10, similarly as explained before, an elastic member 35, being operated by the rod 36, may rock levers 38 and 39, thus shifting the reverse sleeve into forward or reverse position, as may be desired. 37 represents a fuel control valve, one each of said valves being arranged to be controlled by the respective reverse couplings shifting levers 38 and 39 as will be explained. These fuel control valves as shown herein, are arranged in series, and in such manner, that if levers 38 and 39 shift the respective couplings either in advance or retard positions, said fuel control valves will permit fuel to pass through said valves, only, provided the respective claws of both couplings are fully thrown into driving positions and the respective driving and driven surfaces of both couplings are substantially fully engaged. If the claws are driving only at their respective edges or are partly thrown in, no fuel can pass through either one of said valves, even if the engine is being driven or rotated by electricity, or air. This arrangement therefore reduces the danger of breakage of parts of the reversing mechanisms and of accidents resulting therefrom. One fuel valve is sufficient, even if several sets of couplings are used, as in the present case, provided it is automatically controlled by the several respective sleeves, as shown in Fig. 10. This fuel control valve has also been shown in Fig. 5 and will be shown in detail in Fig. 12 and explained.

Fig. 11 shows a longitudinal section, through an elastic member, which may be used in connection with the coupling shifting device shown in Fig. 10, being somewhat different from the one shown in Figs. 4 and 5. The elastic member 35 shown herein, consisting of a cylindrical part, a rod moving therein, a collar fixed on the rod and two springs, which latter may be arranged adjustable as shown. The action of the member need not be further explained in view of previous explanations, relating to the elastic member 18 shown in Figs. 4 and 5. Fig. 12 shows a vertical section through a fuel control valve, which may be used in connection with my reverse gear, being shown in Figs. 5 and 10 and being marked 37 therein. 42 may be a casing, 43 and 44 may respectively be fuel inlet and fuel outlet, 45 and 46 may be fuel valves, 47 and 48 may be caps, which latter may each keep a spring under tension, thus keeping the valves normally closed. The manner in which the fuel valves may be controlled, and the advantages of using the valve, have previously been explained. This feature is important, as it may otherwise happen that respective claws are only engaged on their driving and driven edges, causing occasional slippage and heavy shocks resulting in breaks or accidents, if under such circumstances, the full explosive power of the fuel acts on the reverse gears and cams. If the fuel control valve shown herein, is used, such accidents are entirely impossible, because fuel can not enter into any cylinder, if any one of the respective claws is only partly engaged.

It is clear, that in the device thus far described, the camshaft must always revolve in one and the same direction of rotation, no matter whether the crankshaft rotates in forward or reverse direction. It is, however, evident, that if the engine is to be reversed in the manner described, a system of timing is required which assures correct succession of the fuel cams, etc., and correct timing of the camshaft, or of the several camshafts, if the engine is reversed, while the identical cams and eccentrics, etc., may be used, for operating the valves, fuel pumps, etc. In broadly expressing the principle of my system of reversing and timing, it may be stated, that in single cylinder engines the crankshaft may be reversed, while the camshaft may be driven in one and the same direction of rotation, provided that a reverse gear or coupling is used, wherein the driving and driven surfaces are so arranged, that the coupling may be shifted directly from its forward into its reverse driving position, and vice versa, while the crank is in top dead center position, substantially without changing the angular position of the reverse gears, while the cam shaft and crankshaft remain in their angular positions. This may be accomplished, by means of a coupling, as shown in Figs. 1 to 3, by shifting it substantially axially, provided the driving and driven coupling surfaces are arranged, as will now be fully set forth and explained, on hand of diagrams and schemes, which will serve to illustrate my invention.

Referring to Figs. 13 and 14, simultaneous angular positions of crank and fuel cam are shown, Fig. 13 representing the crank in top dead center position while Fig. 14 may represent the fuel cam, being correctly timed, in relation to the crank for this particular engine, at forward direction of rotation of crankshaft. Fig. 15 shows a scheme, wherein the line marked $A^1$, $A^2$, $A^3$, $A^4$, represents the angular positions of all of the driving and driven surfaces of a reverse coupling as seen in Figs. 1 and 4 the arrows showing corresponding direction of rotation and the direction of shifting the reverse coupling, corresponding arrows and figures being used in all figures of this application, in order to facilitate explanation. It will be seen, from Fig. 15, that all coupling surfaces may be, as shown, within one plane, while the crank is in top dead center position (Fig. 13) and while the cam is in correspondingly timed position (Fig. 14), for forward direction of rotation of the crankshaft. The latter now revolves in forward direction, that is, the crank and the coupling sleeve revolve in direction of the double arrow, an angle of $\alpha$ degrees, while the coupling sleeve having driving surface $A^1$, and the respectively driven coupling member or gear having the driven surface $A^2$, simultaneously revolve an angle of $\alpha$ degrees, in the same angular direction, provided the coupling sleeve, revolves at crankshaft speed. In the meantime, the camshaft, if the engine is of the 4 cycle type, has turned an angle of $\frac{\alpha}{2}$ degrees, and if it is of the 2 cycle type, may have turned an angle of $\alpha$ degrees. The coupling surfaces $A^1$, $A^2$, $A^3$, will now be in the position as shown in Fig. 16, the coupling surface $A^4$ having moved angularly $\alpha$ degress, in the opposite direction of rotation as the surface $A^1$, $A^2$, $A^3$, as shown. Assumed now, that the crankshaft, and therefore the coupling members, while being in these relative angular positions are reversed by means of the starting and reversing motor, the crank may revolve backward, that is in the direction of the single arrows, say an angle of 2 $\alpha$ degrees, while the sleeve, having the driving surface $A^3$ simultaneously revolves backward, that is in direction of the single arrow, an angle of 2 $\alpha$ degrees, before the sleeve containing the surfaces $A^3$ will be in a position to pick up and drive the other reverse gear, the latter having the driven surface $A^4$, while the reverse gear having the driven surface $A^2$, and the camshaft, remain stationary. The positions of the coupling surfaces are therefore now as shown in Fig. 17. It is clear, that while the crank shaft has been reversed and has again been moved 2 $\alpha$ degrees that is $\alpha$ degrees past top dead center position, the camshaft still remains in the identical angular position and therefore in the same angular relation to the crankshaft as it was, before the latter was reversed. If the crankshaft now continues to revolve in reverse direction of rotation, the camshaft will simply be driven in the same direction as before, that is in the direction of the double arrow, remaining correctly timed Figs. 18 to 21 inclusive, show four successive angular positions of the coupling surfaces during two complete revolutions and at intervals of 180 degrees turn of the crankshaft, either in forward or reverse direction of rotation and while the crank is in dead center positions. It can be seen that the positions shown for forward and reverse are the same. Figs. 22 to 25, inclusive, again show four successive angular positions of the coupling surfaces, while the crank is in dead center position, the coupling surfaces being again so arranged, that the coupling may be reversed, without changing the timing of the camshaft, if being reversed in the positions shown. Figs. 26 to 29 inclusive, show four successive angular positions of coupling surfaces, while the crank is in of coupling surfaces, in these latter four figures the coupling members having two claws each respectively for forward and reverse, such as shown in Fig. 3, the claw surfaces of each respective driving and driven member being set at 180 degrees, being respectively marked $A^1$ and $A^{1\prime}$, $A^2$ and $A^{2\prime}$, $A^3$ and $A^{3\prime}$, $A^4$ and $A^{4\prime}$. It will be seen that in all dead center positions of the crank, the sleeve may be shifted from forward into reverse driving position and vice versa, without changing the angular relation of the reverse gears and therefor without changing the timing of the camshaft. The above schemes may suffice to show how the claw surfaces may be arranged.

In expressing the principle of my system of reversing as broadly as possible, I may state that, in a single cylinder engine, or in a multi-cylinder engine wherein all cranks are located within a single plane through the main axis of the crankshaft, the respective coupling members may have their driving and driven surfaces so arranged, during dead center positions of the cranks, that the relative angular positions of the reverse gears will remain the same, no matter, whether the coupling members are engaged for forward or reverse, it being immaterial, within what plane or planes the driving and driven surfaces may be. If these conditions prevail as in applicant's design, the rotation of the crankshaft may be changed from forward to reverse and vice versa or in other words, the engine may successively be reversed, as explained, the timing remaining always the same as it was originally. A single cylinder 4 cycle or 2 cycle engine may therefore thus be reversed, provided the reverse gear is arranged as above described, while the camshaft revolves in one and the same constant direction during forward and reverse rotation of the crankshaft.

While starting on air, electricity, or other power, in forward or reverse, the crankshaft may make one or several revolutions, while the camshaft may remain stationary, this however does not affect the timing of the camshaft, which will always remain the same as it was originally, provided, that the reverse coupling members each have only one claw respectively, for forward and reverse, revolving at crankshaft speed, and being arranged as above set forth. If the coupling revolves at camshaft speed, in a 4 cycle engine, or at one half crankshaft speed, the coupling members may, if desired, each have two claws, as shown in Fig. 3, the back of each claw preferably again gradually rising in a spiral curve from its lowest to its highest point. In order to insure proper action of the engine, if my system of reversing is used, the cams, eccentrics, etc., which are operating suction and discharge valves, fuel pumps, atomizers, ignition, or other mechanisms, requiring correct timing, preferably are all being driven from the camshaft, in order to maintain correct timing. This is particularly important for the operation of the engine, as it assures, that fuel can only be discharged and enter into a cylinder, if the camshaft is revolving and if therefor all other engine parts are being correctly timed.

Figs. 30 and 31 relate to a 2 cylinder 2 cycle engine having respectively opposed cranks and opposed fuel cams, thus injecting fuel at forward as well as at reverse direction of rotation of crankshaft, successively at periods of 180 degrees turn of crankshaft. The engine may be reversed exactly as the one cylinder engine, as will be easily understood. Again referring to Fig. 30 and furthermore to Fig. 32, these diagrams relate to a 2 cylinder 4 cycle engine, which latter also can be reversed in the manner explained. By looking at the latter two diagrams, it is seen, that the cranks are opposed, while the two cams are offset 90 degrees, fuel being injected twice during 180 degrees turn of the crank shaft, after which no fuel is injected for 540 degrees turn of crankshaft or for 270 degrees turn of camshaft. It is clear, that since cams 1 and 2 are on the same camshaft, the cam 2 can not be timed differently in relation to the crankshaft, provided that cam 1 is being correctly timed, and this may be done, by timing crank 1 and cam 1 as heretofore explained in relation to a 1 cylinder engine. Figs. 33 and 34 refer to diagrams of a 4 cylinder 4 cycle engine, all cranks lying within a single plane through the main axis of the crankshaft, two cranks being offset 180 degrees in relation to the other two cranks. It is clear, from these diagrams, that if the crankshaft and the camshaft both revolve in the direction of the double arrow, the cranks get into top dead center positions in the succession I, II, III, IV and the fuel cams get into corresponding positions in the same succession. If the cranks are reversed, revolving now in the direction of the single arrow, it will be seen, that as a result of the cranks I and III being opposed to the cranks II and IV the cranks nevertheless continue to get into top dead center positions in the same succession as before, while the cams, revolving only in one single direction of rotation, will of course follow in the same succession as before, the timing remaining identically the same at reverse as it was at forward direction of rotation of crankshaft, identical couplings, as shown in connection with the 1 cylinder 4 cycle engine, previously described, being used, the coupling surfaces being arranged exactly in the same manner.

Similarly as the four cylinder engine just explained, any multicylinder engine having all cranks within a single plane through the main axis of the crankshaft may be reversed by using the same coupling as the one shown and explained in connection with a single cylinder engine.

While my invention is particularly of value for 4 cycle engines, wherein a larger number of cams are used as in 2 cycle engines, nevertheless it may be used to advantage with 2 cycle, as well as 4 cycle engines. I will now explain the action of a 4 cylinder 2 cycle engine in connection with my reverse mechanism. In all previous engines described, either single cranks were used, or a plurality of cranks, the latter being offset 180 degrees. In a 4 cylinder two cycle engine, two of the cranks are opposed to each other, while the other two cranks are also opposed to each other, being offset 90 degrees in relation to the first two cranks, as seen in Fig. 35, the cranks reaching top dead center positions at equal intervals of 90 degrees turn of crankshaft, in the succession 1, 2, 3, 4 at forward direction of rotation of crankshaft, that is in the direction of the double arrow. The fuel cams Figs. 36 and 37 reach corresponding positions in the same succession, that is 1, 2, 3, 4, at intervals of 90 degrees turn of the camshaft, while the crankshaft revolves in forward direction. It is evident, that if the crankshaft is reversed, the cranks will get into top dead center positions, in the succession 1, 4, 3, 2, while the cams, revolving in one single direction, still continue to operate in the succession 1, 2, 3, 4. The cylinders 4 and 2 would therefore receive fuel, while the cranks 2 and 4 are at their lower dead center positions, which would make the engine inoperative. In order to overcome this difficulty, I propose to use two separate camshafts and two complete sets of reverse gears, as shown in Figs. 7, 36 and 37. My scheme further consists in changing the angular position of one of said camshafts, 180 degrees in relation to the other one of said camshafts, each time when the crankshaft is being reversed, and simultaneously therewith. This may be accomplished by revolving the camshaft I containing cams 1 and 3, 180 degrees, while the camshaft II, containing cams 2 and 4 remains stationary, thus bringing cam 4 into the relative angular position towards cams 1 and 3 in which cam 2 had been before and bringing cam 2 into the previous relative position of cam 4. If the two camshafts are now being revolved in direction of the double arrow, while remaining in these relative angular positions, just explained, and while the crankshaft is reversed, the latter revolving in direction of the single arrow, the succession of the top dead center positions of the cranks and of the corresponding fuel cams will be 1, 4, 3, 2, both camshafts therefore being correctly timed. The engine therefore can now be reversed. The manner in which this may be accomplished in practice, will now be explained in connection with Figs. 7 and 8, and with Figs. 38 to 45 inclusive. Figs. 38 to 41 show 4 successive angular positions of the driving and driven coupling surfaces, $A^1$, $A^2$, $A^3$, $A^4$ of reverse coupling set I, the latter driving camshaft I. These four positions relate to one revolution of the crankshaft. while Figs. 42 to 45 show four simultaneous angular positions of the corresponding coupling surfaces $B^1$, $B^2$, $B^3$, $B^4$ of reverse coupling set II, driving camshaft II, during the direction of rotation of cranks, transmission shaft, coupling and camshaft, as indicated by double arrows, which always indicate forward direction of rotation of crankshaft. Simultaneously with said respective angular positions shown in Figs. 38 to 41, and in Figs. 42 to 45 respectively, cranks 1, 2, 3, 4, are in top dead center positions. It will be seen, that while the surfaces $A^1$, $A^2$, $A^3$, $A^4$ are within a plane. (Fig. 38) wherein the coupling sleeve may be shifted from forward into reverse driving position, as previously explained, without disturbing the timing of camshaft I, the respective coupling surfaces $B^1$, $B^2$, $B^3$, $B^4$ are also within a plane. but the respective coupling sleeve, in said position, can not be shifted from forward into reverse driving position, (see Figs. 7 and 8) because the latter sleeve, having the reverse driving surface $B^3$, can not engage the respective driven surface $B^4$, in this position. If the crankshaft is now reversed by the starting motor, while the sleeve of coupling II is pressed towards the reverse position, in direction of the single arrow, the crankshaft, sleeve and camshaft I must revolve 180 degrees in the direction of the single arrow, before the sleeve containing surface $B^3$ will engage the reverse gear containing the surface $B^4$, thus driving the camshaft II. It is therefore seen, that the relative angular positions of camshaft I and camshaft II, revolving at the same speed as the coupling sleeve, have been changed 180 degrees. This is exactly what is required, as has been previously explained, in order to time camshaft II correctly in relation to camshaft I. The timing of camshaft I itself is correct on reverse, because cranks 1 and 3 are respectively opposed and the respective coupling sleeve has been reversed, without changing the timing of cam-shaft I. It will further be seen, from Figs. 38 to 45, that each time a crank is in a dead center position, the one of said couplings may be reversed by shifting the respective sleeve in the direction of the single arrow, from forward into reverse driving position, without disturbing the timing of the respective camshaft, which is being driven by said coupling. It will be seen, that if the other one of said couplings is simultaneously being reversed, by shifting the sleeve in the direction of the single arrow, the timing of the respective camshaft being driven by the latter coupling, will be changed 180 degrees. The engine is therefore reversible. If the crankshaft after running in direction of the single arrow, is again reversed and runs in the direction of the double arrow, that is in forward direction, the angular position of one of the two camshafts will again be changed 180 degrees in relation to the other one of said crankshafts, which produces the succession of top dead center positions of cranks and corresponding positions of cams 1, 2, 3, 4, being timed as originally.

We now will explain the manner of reversing an eight cylinder 4 cycle engine. Fig. 46 shows in a diagrammatic way, angular positions of eight cranks, while Figs. 47 and 48 show simultaneous angular positions of the eight corresponding fuel cams. As seen from Figs. 9 and 10 two separate sets of couplings or reverse gears and two separate camshafts are proposed, which may be called reverse gear sets I and II, (Fig. 9) and camshafts I and II, as marked, similarly as in the four cylinder 2 cycle engine, previously explained, the cranks and the cams being so arranged, that while revolving, they may successively get in the position in which crank 1 and cam 1 (Figs. 46 and 47) are shown, which may represent top dead center position of crank 1, cam 1 being correctly timed for this engine, to correspond to the top dead center position of crank 1, while the latter revolves in direction of the double arrow. It is clear, that if the crankshaft revolves in forward direction of rotation; the successive top dead center positions of the cranks and the corresponding cam positions, may be 1, 2, 3, 4, 5, 6, 7, 8.

This succession may be obtained if the sleeve is pushed into upward driving position wherein surface $B^1$ is pushing against surface $B^2$ in direction of the double arrow. If, however, the crankshaft is reversed and both sleeves are simultaneously gradually pushed into lower driving position (Fig. 9) wherein surface $B^3$ is pushed against surface $B^4$ in direction of the single arrow, the crankshaft and respective sleeve of the reverse coupling set I must revolve at least 180° and the cam shaft I must revolve at least 90° before the respective members of the reverse coupling set II engage and camshaft II can be picked up again and driven in the direction of the double arrow. Assuming that Figs. 47 and 48 respectively represent corresponding cam positions of camshafts I and II and assuming that camshaft I may be driven and revolved 90° while camshaft II remain stationary, it will then be seen that cam 3 is in top position. The cams may now operate in following succession: 3—2—5—4—7—6—1—8.

It will be seen from Fig. 46 that the cranks, which meanwhile revolved 180° in direction of the single arrow, may reach top dead center positions in the same succession namely 3—2—5—4—7—6—1—8 and the cranks and cams therefore are again timed correctly.

If the sleeves of both reverse coupling sets are again reversed while cam 1 is in top position, camshaft II must again stop while camshaft I revolves 90° and the succession of cams may be as follows:

3—8—5—2—7—4—1—6. The cranks revolved meanwhile 180° in direction of the double arrow and the cams therefore are again timed correctly. Assuming that the crankshaft is reversed once more while cam 1 is in top position and that camshaft II again stops while camshaft I revolves 90°, the succession of the cams will be: 3—6—5—8—7—2—1—4 which is again correct because the crankshaft now revolves in direction of the single arrow. At the next following reverse of crankshaft, the latter revolves again in direction of the double arrow and the cranks and cams may operate in the original succession, namely: 3—4—5—6—7—8—1—2.

It is therefore immaterial whether camshaft II stops 90°, 180°, 270° or 360° in relation to camshaft I, the timing of both camshafts remaining always correct in relation to the crankshaft. Referring to Figs. 49 to 56 inclusive, eight successive angular positions of the driving and driven surfaces of coupling I are shown, the latter revolving at crankshaft speed, while the crankshaft makes two revolutions and the two camshafts make each one revolution. In Figs. 57 to 64 inclusive, eight successive angular positions of the driving and driven surfaces of coupling II are shown, the latter eight positions being corresponding simultaneous positions to those shown in Figs. 49 to 56. All positions, shown in Figs. 49 to 64 inclusive, are simultaneous with top dead center positions of the respective cranks. It will be seen from Fig. 49, that the coupling surfaces $A^1$, $A^2$, $A^3$, $A^4$, of coupling I are within a plane and that the respective sleeve may be shifted from forward into reverse driving position, without changing the relative angular positions of the respective reverse gears. The sleeve in coupling set I may thus be shifted in reverse, that is in direction of the single arrow, and the coupling set I may be reversed, without disturbing the timing of camshaft I. It will also be seen, by looking at the simultaneous corresponding angular positions of the driving and driven coupling surfaces of coupling set II, that, if the crankshaft is reversed by the reversing motor, after the engine has stopped in position shown in Fig. 57, the reverse coupling member containing the driven surface $B^4$, and therefore the camshaft II, remains stationary, while the starting motor is turning the crankshaft, reverse gear set I and the camshaft I, the crankshaft and the reverse gear set, revolving 180 degrees in direction of the single arrow, before the sleeve containing the driving surface $B^3$ will pick up the coupling member having the driving surface $B^4$ and thus driving reverse gear set II and camshaft II. It is therefore clear, that camshaft II revolving at half angular speed of the coupling sleeve of reverse gear set II, will have been retarded or shifted 90 degrees in relation to camshaft I, during reverse. As a result of retarding the camshaft II 90 degrees, as will be seen from Figs. 47 and 48, the two camshafts may continue to revolve in the direction of the double arrow, while the crankshaft may revolve in reverse direction, the succession of the cranks and of the corresponding cams, being now 3, 2, 5, 4, 7, 6, 1, 8. This succession is possible, because two cranks are simultaneously in top dead center positions and since the camshaft will operate all valves, fuel pumps and timing mechanisms, the cylinders and powerstrokes following in the same succession as the fuel cams. The timing of the two camshafts therefore remains correct. If the crankshaft is stopped and again started to revolve in forward direction of rotation, either camshaft I or camshaft II will again be retarded 90 degrees as fully explained hereinbefore. The various diagrams of schemes shown in Figs. 49 to 64 inclusive, in relation to the eight cylinder 4 cycle engine, may serve to show, that if the crankshaft is reversed in any one of these eight positions, the timing of one of the camshafts remains correct, while the other camshaft will always be retarded as required. The engine may be successively reversed as often as desired, without disturbing correct timing of any or all fuel cams or of course of any other cams or eccentrics.

It is evident, that since the fuel cams are a part or parts of the camshaft or of the several camshafts, all other cams and eccentrics, which are also parts of the camshaft or camshafts, or driven thereby, must be correctly timed, if the fuel cams are correctly timed, because each of the camshafts revolve only in a single direction.

Fig. 65 represents a scheme showing diagrammatically how my devices may be combined and arranged in a novel manner in connection with a 4 cylinder 4 cycle engine.

100 may represent the base of an engine, 105 may be a crankshaft, 101 may be a casing. A turbine or independent starting motor for starting the engine, may be mounted on the crankshaft within the casing similarly as shown in my above mentioned U. S. Patent No. 1,165,539. Details of the turbine are not shown herein because this does not constitute a part of the present invention. Any known auxiliary starting motor or power may be used and the motor may or may not be mounted directly on the crankshaft. 102 may be a casing containing a worm gear drive similar to the one shown and explained in Fig. 1. 4 may represent a vertical transmission shaft, being driven from the crankshaft similarly as shown in Fig. 1. 8, 2 and 3 may be reverse gears, 1 may be a shiftable reverse coupling member and 9 may be a camshaft. The reverse gears and coupling members may be arranged in relation to the camshaft and transmission shaft substantially as shown and explained in connection with Fig. 6. From previous explanations it will be fully understood that the camshaft may be driven from the crankshaft and may revolve only in one and the same constant direction, correctly timed, no matter whether the crankshaft revolves in forward or reverse direction. The camshaft may revolve at one half crank shaft speed as shown. 10 may indicate a starting and reversing lever, 11 may be a fluid control valve or starting device and 23 may be a flexible member, substantially as shown in Figs. 4 and 5. 109, 112 and 113 may be rocking levers or arms and 110 and 111 may be pull rods or the like, all arranged respectively in such manner that the lever 113 as a result of the flexible member 23, may gradually shift the coupling member 1 into forward or reverse positions, while the lever 10 may instantly operate a starting and reversing mechanism or valve for the auxiliary motor, thus revolving the engine crankshaft, as explained hereinbefore. 37 may indicate a fuel control device or valve, (substantially as shown in Fig. 12) which may be controlled through the starting and reversing lever 10, through means of the same levers and pull rods, which may simultaneously or successively control the shiftable coupling member 1, the arrangement being similar as previously explained in connection with Fig. 5. 106 may be a fuel inlet for the fuel control device 37, this inlet being connected with a source of fuel not shown herein, 107 may be a fuel outlet from the device. 108 may represent a fuel pump, such as commonly used in connection with solid injection internal combustion engines. 119 may indicate a fuel inlet to the pump which inlet, as shown, may be connected to the fuel outlet 107 of the control device 37. 120 may indicate respectively fuel outlets or discharge openings of the pump, connecting respectively with cylinder heads 121 of the engine. Through the action of the pump, fuel may at proper moments be sprayed into the respective cylinder heads in well known manner. While it is advisable and customary to control the fuel automatically through means of a centrifugal speed regulator, this has not been shown herein because it is not a novel part of the present invention. 104 may be an air compressor of a known type and 103 may be a tank for storing compressed air received from the compressor, the tank being connected with a fluid control or starting device 11, the latter in turn being connected with the casing containing the air turbine. All fuel pipe connections and fluid or compressed air pipe connections have been shown by heavy lines, indicating diagrammatically the general arrangement. If the lever 10 is shifted into position F. S. (see Fig. 5) one of the two valves within the starting device may be opened and compressed air may flow from the tank through the valve and through a pipe into an inlet 118 of the turbine casing 101, starting the turbine and crankshaft in one direction. If the lever 10 is shifted into position R. S. the other one of the two valves within the device may be opened and compressed air may flow into the casing 101 through the opening at 117, starting the turbine and crankshaft in opposite direction. If the lever 10 is placed in positions F or R, the compressed air is cut off from the turbine casing. Simultaneously while controlling the compressed air starting device, or successively thereto, the lever 10 may operate or shift the reverse coupling member 1. If the lever 10 is in the position F. S. the crankshaft may revolve in forward direction, and the member 1, as a result of the flexible member 23, is gradually forced into forward position wherein the camshaft is driven, correctly timed to the crankshaft, while the latter revolves in forward direction. If the lever 10 is placed in position R. S., the member 1 may gradually be forced into reverse position, provided the crankshaft is meanwhile revolved by means of the auxiliary starting motor in reverse direction. The camshaft on reverse at first is completely disconnected from the crankshaft, but after at most one revolution of the crankshaft, a reverse coupling member may engage again the respective driven or driving member, as the case may be and the camshaft is again driven in one and the same constant direction from the reversed crankshaft, timed again correctly to the latter. The manner in which correct timing of the camshaft is maintained on reverse of the crankshaft has been fully explained hereinbefore in connection with single and multicylinder engines of 2 and 4 cycle type and need not to be further explained. Referring again to the lever 10, it will be seen that a flexible member 23 is inserted between pull rods 110 and 111. The lever 10 may therefore instantly operate or control the starting device or mechanism for starting the auxiliary motor, no matter whether the respective coupling members may be in positions wherein the respective teeth of the members may block each other, as shown in Fig. 5, or whether the respective teeth permit the member to be instantly shifted into position wherein the members are immediately engaged with each other in forward or reverse driving or driven positions. It will moreover be seen, that if the lever, after the engine has been started in either direction, is partly withdrawn into position F. or R., the coupling member may be kept in safe running position, while the starting device or mechanism entirely cuts off compressed air, or whatever medium may be employed for operating the auxiliary starting motor. It will furthermore be understood that if the lever 10 is placed in center or stop position, marked St. in Fig. 5, all coupling members are completely disengaged from each other and the compressed air or fluid, as well as fuel, are cut off from the starting device and the starting motor. The fuel pump may be driven either directly or indirectly from the camshaft in known manner, by means of cams or eccentrics or the like and remains timed correctly on reverse of the engine. If the respective coupling members become disengaged the camshaft instantly stops, preventing instantly further fuel injection, which is a safety device and assists in quickly stopping the engine.

The fuel control device 37, shown in detail in Fig. 12, is shown in Fig. 65, in order to more clearly show how it may cooperate in connection with the fuel pump. This fuel control device is still another safety device whereby the engine is prevented from running on fuel, if one of the respective driving or driven members or the respective coupling teeth are not engaged to their full or normal depth where timing may be incorrect or driving may not be safe. This latter device is equally effective for both forward or reverse of the engine. Until the coupling teeth are substantially fully engaged, the crank shaft may be revolved by the auxiliary motor but cannot be driven by its own fuel power. Fuel and compressed air are cut off completely if the lever 10 is placed into stop position.

From the above it is clear that the lever 10 can be placed instantly into forward or reverse starting or running position and that the flexible member assures, after a revolution or less of the crankshaft, that the shiftable coupling member is automatically forced fully into forward or reverse position, whereupon fuel connection is established and the engine runs on its own power.

From these explanations it is also evident that the lever 10 may completely serve for starting, stopping and reversing the engine, while speed control or other devices may or may not be used simultaneously.

It has been stated in the specification, that an engine may be reversed, according to my scheme, provided that while a crank is in dead center position, a coupling member may be reversed, substantially without changing the relative angular positions of the gears of a set of reverse gears. It is not usually required, that an engine is timed within one or two degrees, of its most favorable position. Many engines may, if reversed for a short time, run pretty well, if the timing may be several degrees earlier or later than the most favorable position of timing. The word "substantially" may cover sufficiently accurate timing of the camshaft, if being reversed according to my scheme, to permit the engine to work satisfactorily.

The expression "set of reverse coupling members" as used in the claims, may signify a shiftable sleeve or member and preferably of a plurality of intermeshing reverse gears, with coupling claws arranged in suitable manner.

Various modifications may be made in the invention without departing from the spirit thereof and the present exemplification is to be taken as illustrative and not limitative thereof.

Having thus explained my invention, I claim:

1. In a reversible internal combustion engine, a crankshaft, a camshaft, a set of reverse coupling members adapted to be driven by said crankshaft and in turn selectively driving said camshaft, an auxiliary starting motor adapted for revolving said crankshaft successively in forward and reverse directions, one of the said members being so arranged that it may be shifted and revolved respectively into forward and reverse position each time said crankshaft is reversed, said camshaft being selectively driven by said members in constant direction, substantially correctly timed to said crankshaft no matter whether the latter revolves in forward or reverse direction, means being provided for operating said engine on its own motive power after said crankshaft is driving said camshaft, substantially as and for the purpose set forth and explained.

2. In a reversible internal combustion engine, a crankshaft, a plurality of camshafts, a plurality of sets of reverse coupling members adapted to be driven by said crankshaft and in turn selectively driving said camshafts, an auxiliary starting motor adapted for revolving said crankshaft successively in forward and reverse directions, one of said members of each of said sets being so arranged that it may be shifted and revolve respectively into forward and reverse position each time said crankshaft is reversed, said camshafts being respectively selectively driven by said members in constant direction, substantially correctly timed to said crankshaft no matter whether the latter revolves in forward or reverse direction, means being provided for operating said engine on its own motive power after said crankshaft is driving said camshaft, substantially as and for the purpose set forth and explained.

3. In a reversible internal combustion engine, a crankshaft, a camshaft, a set of reverse coupling members adapted to be driven by said crankshaft and in turn selectively driving said camshaft, an auxiliary starting motor adapted for revolving said crankshaft successively in forward and reverse directions, one of the said members being so arranged that it may be shifted and revolved respectively into forward and reverse position each time said crankshaft is reversed, said camshaft being selectively driven by said members in constant direction, substantially correctly timed to said crankshaft no matter whether the latter revolves in forward or reverse direction, a starting lever or the like controlling a medium for operating said auxiliary motor, flexible connecting means being provided between said lever and said shiftable member, means being provided for operating said engine on its motive power after said crankshaft is driving said camshaft.

4. In a reversible internal combustion engine, a crankshaft, a camshaft, a set of reverse coupling members adapted to be driven by said crankshaft and in turn selectively driving said camshaft, an auxiliary starting motor adapted for revolving said crankshaft successively in forward and reverse directions, one of the said members being so arranged that it may be shifted and revolved respectively into forward and reverse position each time said crankshaft is reversed, said camshaft being selectively driven by said members in constant direction, substantially correctly timed to said crankshaft no matter whether the latter revolves in forward or reverse direction, a fuel valve for said engine, connecting means being provided between said fuel valve and said shiftable member in such manner that said valve is open only if said shiftable member is engaged substantially at full depth, means being provided for operating said engine on its own motive power after said crankshaft is driving said camshaft.

5. In a reversible internal combustion engine, a crankshaft, a camshaft, a set of reverse coupling members adapted to be driven by said crankshaft and in turn selectively driving said camshaft, an auxiliary starting motor adapted for revolving said crankshaft successively in forward and reverse directions, one of the said members being so arranged that it may be shifted and revolved respectively into forward and reverse position each time said crankshaft is reversed, said camshaft being selectively driven by said members in constant direction, substantially correctly timed to said crankshaft no matter whether the latter revolves in forward or reverse direction, a starting lever of the like controlling a medium for operating said auxiliary motor, flexible connecting means being provided between said lever and said shiftable member, a fuel valve for said engine, connecting means being provided between said fuel valve and said shiftable member in such manner that said fuel valve is open only if said shiftable member is engaged substantially at full depth, means being provided for operating said engine on its own motive power after said crankshaft is driving said camshaft.

Dr. PAUL PRAETORIUS.